United States Patent [19]

Skogler et al.

[11] Patent Number: 4,807,096

[45] Date of Patent: Feb. 21, 1989

[54] INTERIOR LIGHT/CARRIER MODULE FOR VEHICLES

[75] Inventors: Brian I. Skogler, Spring Lake; Kenneth Schofield; William P. Lantz, both of Holland; Eldon J. Nyhof, Zeeland; Dorothy J. Helder; Charles M. Flowerday, both of Holland, all of Mich.

[73] Assignee: Donnelly Corporation, Holland, Mich.

[21] Appl. No.: 132,004

[22] Filed: Dec. 11, 1987

Related U.S. Application Data

[63] Continuation of Ser. No. 879,158, Jun. 26, 1986, Pat. No. 4,733,336.

[51] Int. Cl.⁴ ............................................. F21F 33/00
[52] U.S. Cl. .................................... 362/142; 362/74; 362/61; 362/362
[58] Field of Search ................. 362/74, 142, 61, 362

[56] References Cited

U.S. PATENT DOCUMENTS

| | | | |
|---|---|---|---|
| D. 50,200 | 1/1917 | Hawthorne . | |
| D. 115,802 | 7/1989 | Soderberg . | |
| D. 162,507 | 3/1951 | Arenberg et al. | D48/32 |
| D. 168,065 | 10/1952 | Paine | D14/6 |
| D. 188,508 | 8/1960 | Morgenstern | D48/32 |
| D. 189,844 | 3/1961 | Cleminshaw et al. | D14/6 |
| D. 206,924 | 2/1967 | Prouty et al. | D86/10 |
| D. 207,065 | 2/1967 | Lee | D48/32 |

(List continued on next page.)

FOREIGN PATENT DOCUMENTS

| | | |
|---|---|---|
| 551492 | 1/1958 | Canada . |
| 165817 | 12/1985 | European Pat. Off. . |
| 877866 | 7/1949 | Fed. Rep. of Germany . |
| 7323996 | 11/1973 | Fed. Rep. of Germany . |
| 3218184A1 | 12/1983 | Fed. Rep. of Germany . |
| 3311140A1 | 10/1984 | Fed. Rep. of Germany . |
| 617921 | 11/1926 | France . |
| 811385 | 1/1937 | France . |
| 1021987 | 12/1952 | France . |
| 1292308 | 5/1962 | France . |
| 1311945 | 11/1962 | France . |
| 478282 | 2/1953 | Italy . |
| 652189 | 4/1951 | United Kingdom . |
| 933078 | 8/1963 | United Kingdom . |
| 1008411 | 10/1965 | United Kingdom . |
| 1020794 | 2/1966 | United Kingdom . |
| 1053546 | 1/1967 | United Kingdom . |
| 1053545 | 1/1967 | United Kingdom . |
| 1289480 | 9/1972 | United Kingdom . |

OTHER PUBLICATIONS

Exhibit A—Photograph—Datsun 1975 280Z rearview mirror.
Exhibit B—Photograph—Datsun 1978 510 rearview mirror.
Exhibit C—Photograph—Honda rearview mirror.
Exhibit D—Photograph—Honda rearview mirror.
Exhibit E—Photograph—Mercedes rearview mirror.
Exhibit F—Photograph—Metagal (Brazil) rearview mirror.
Exhibit G—Drawing of parabolic reflector used in prototype of lighted rearview mirror of the type disclosed in European Application No. 165,817 (included herein) in Oct. or Nov., 1984.

*Primary Examiner*—Larry Jones
*Attorney, Agent, or Firm*—Price, Heneveld, Cooper, DeWitt & Litton

[57] ABSTRACT

A carrier module is disclosed for supporting lights for illuminating portions of a vehicle interior, instruments such as directional compasses or the like, and controls such as switches or instrument adjustment units. The carrier modules may be mounted in housings on the vehicle interior. Each module preferably includes a rigid body or support and a pair of spaced mounting projections thereon for removably mounting the carrier module in a housing or other support. One of the mounting projections is resilient. An opening is provided in the body adjacent the resilient projection to allow insertion of a tool for releasing the module from the housing or support.

41 Claims, 9 Drawing Sheets

U.S. PATENT DOCUMENTS

| | | | |
|---|---|---|---|
| 1,206,871 | 12/1916 | Locke . | |
| 1,353,253 | 9/1920 | Livingston et al. . | |
| 1,528,082 | 3/1925 | Schlaich . | |
| 1,615,936 | 2/1927 | Donovan . | |
| 1,657,334 | 1/1928 | Adams . | |
| 1,667,545 | 4/1928 | Goddard . | |
| 1,761,393 | 6/1930 | Hoegger . | |
| 1,814,728 | 7/1931 | Moore . | |
| 1,849,708 | 3/1932 | Colbert et al. . | |
| 1,884,759 | 10/1932 | La Hodny . | |
| 1,908,767 | 5/1933 | La Hodny . | |
| 1,912,902 | 2/1933 | Kramer . | |
| 1,973,908 | 9/1934 | McIlwee | 240/4.1 |
| 2,012,593 | 8/1935 | Strong | 240/7.1 |
| 2,046,393 | 7/1936 | Lewinsohn et al. | 240/4.1 |
| 2,048,939 | 7/1936 | Leathorn | 240/4.2 |
| 2,149,598 | 3/1939 | Girl et al. | 240/4.2 |
| 2,166,303 | 7/1939 | La Hodny et al. | 35/62 |
| 2,268,189 | 12/1941 | Colbert | 240/4.2 |
| 2,414,223 | 1/1947 | De Virgilis | 240/4.2 |
| 2,428,649 | 10/1947 | Brown | 240/4.1 |
| 2,457,348 | 12/1948 | Chambers | 177/329 |
| 2,461,315 | 2/1949 | De Virgilis | 240/4.2 |
| 2,561,582 | 7/1951 | Marbel | 177/329 |
| 2,570,569 | 10/1951 | Leathorn | 240/4.2 |
| 2,580,258 | 12/1951 | Tarasuk | 240/4.2 |
| 2,600,751 | 6/1952 | Gazda | 177/329 |
| 2,640,909 | 6/1953 | Montgomery | 240/4.2 |
| 2,641,684 | 6/1953 | Dillon | 240/7.1 |
| 2,673,914 | 3/1954 | Sundt | 200/167 |
| 2,737,852 | 3/1956 | Porter et al. | 88/98 |
| 2,996,608 | 8/1961 | Clayton | 240/7.35 |
| 3,035,160 | 5/1962 | Cleminshaw | 240/4.2 |
| 3,104,830 | 9/1963 | Rock | 240/4.2 |
| 3,152,216 | 10/1964 | Woodward | 88/77 |
| 3,211,903 | 10/1965 | McElreath | 240/4.2 |
| 3,214,578 | 10/1965 | Talbot | 240/4.2 |
| 3,317,906 | 5/1967 | Baldridge | 340/366 |
| 3,375,364 | 3/1968 | Marcus | 240/4.2 |
| 3,541,018 | 11/1970 | Barcus et al. | 240/4.2 |
| 3,574,283 | 4/1971 | Albers | 73/178 |
| 3,926,470 | 12/1975 | Marcus | 296/97 |
| 4,000,404 | 12/1976 | Marcus | 240/2 |
| 4,023,029 | 5/1977 | Fischer | 240/4.2 |
| 4,039,818 | 8/1977 | Hickman | 240/2.18 |
| 4,075,468 | 2/1978 | Marcus | 362/144 |
| 4,109,235 | 8/1978 | Bouthors | 340/52 |
| 4,133,405 | 1/1979 | Turek | 180/90 |
| 4,167,113 | 9/1979 | Mann | 73/178 |
| 4,174,864 | 11/1979 | Viertel et al. | 296/97 |
| 4,203,149 | 5/1980 | Viertel et al. | 362/144 |
| 4,227,241 | 10/1980 | Marcus | 362/61 |
| 4,227,242 | 10/1980 | Marcus | 362/61 |
| 4,274,078 | 6/1981 | Isobe et al. | 340/98 |
| 4,353,592 | 10/1982 | Cziptschirsch | 296/97 |
| 4,443,831 | 4/1984 | Godfrey et al. | 362/80 |
| 4,475,100 | 10/1984 | Duh | 340/98 |
| 4,479,172 | 10/1984 | Connor | 362/135 |
| 4,499,451 | 2/1985 | Suzuki et al. | 340/98 |
| 4,511,954 | 4/1985 | Marcus et al. | 362/275 |
| 4,588,267 | 5/1986 | Pastore | 350/600 |

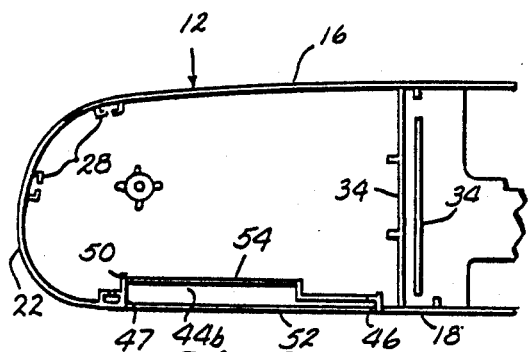
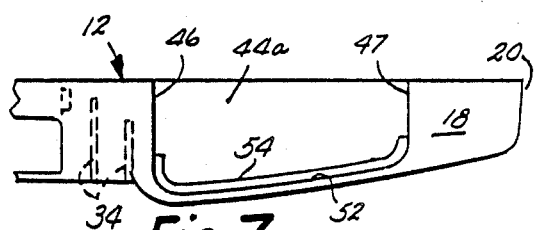
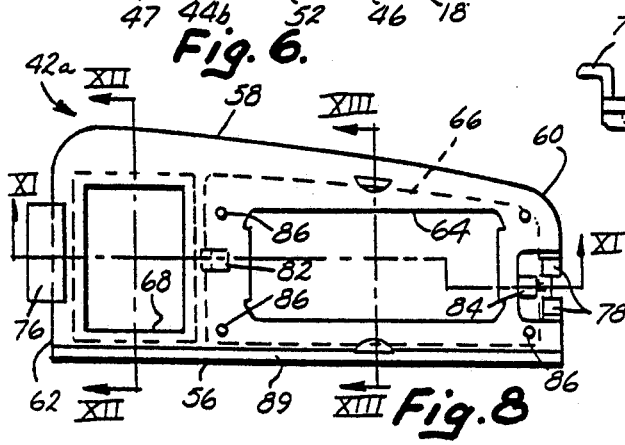
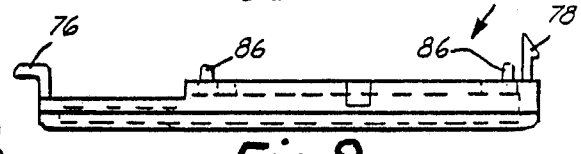
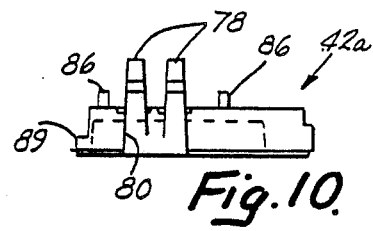
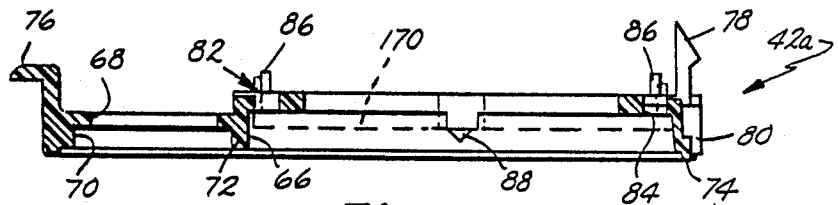
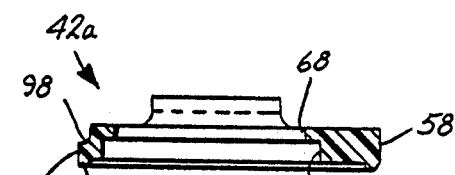
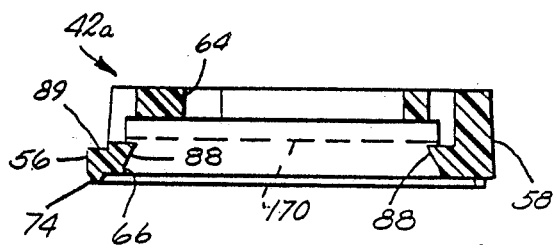

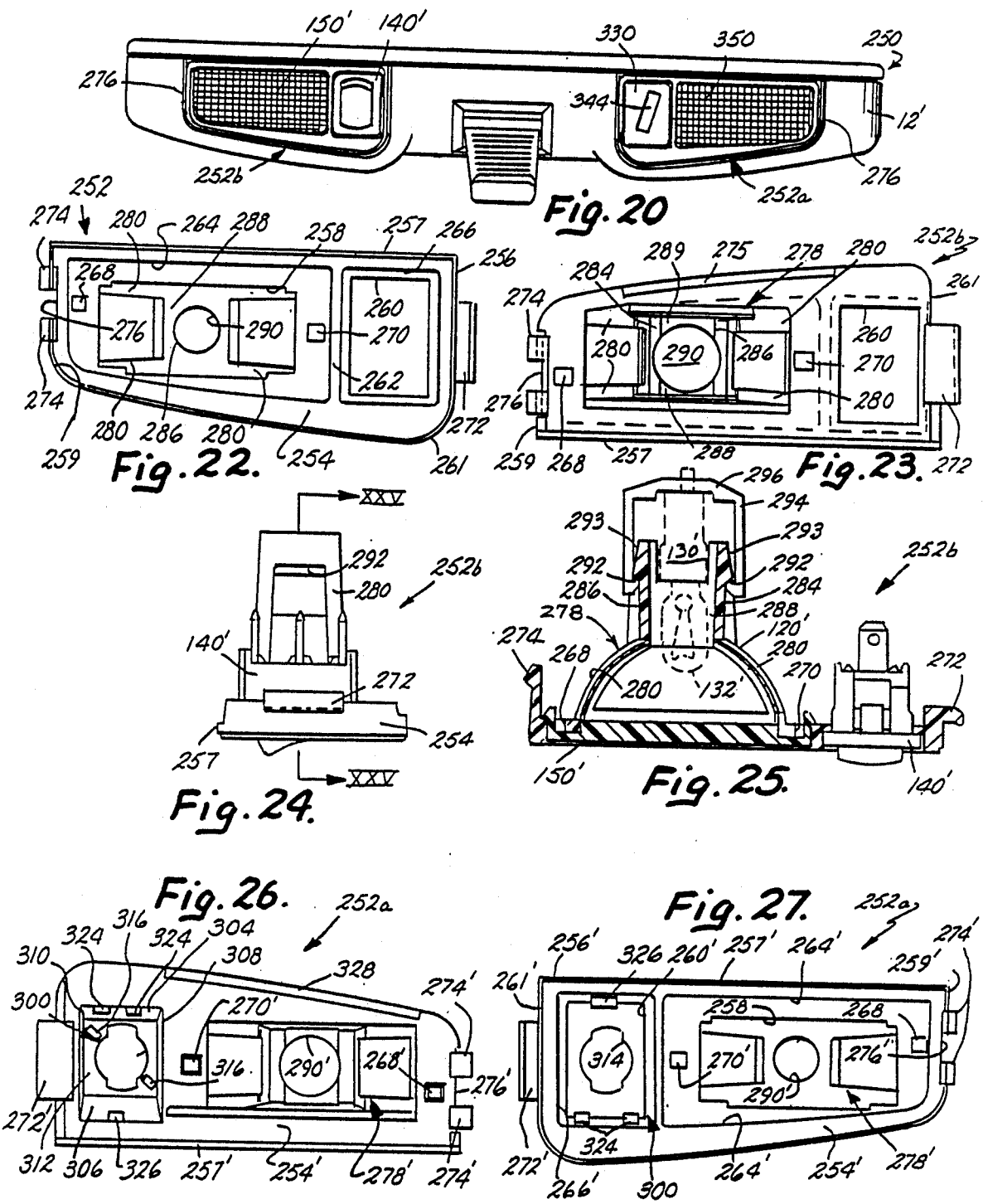

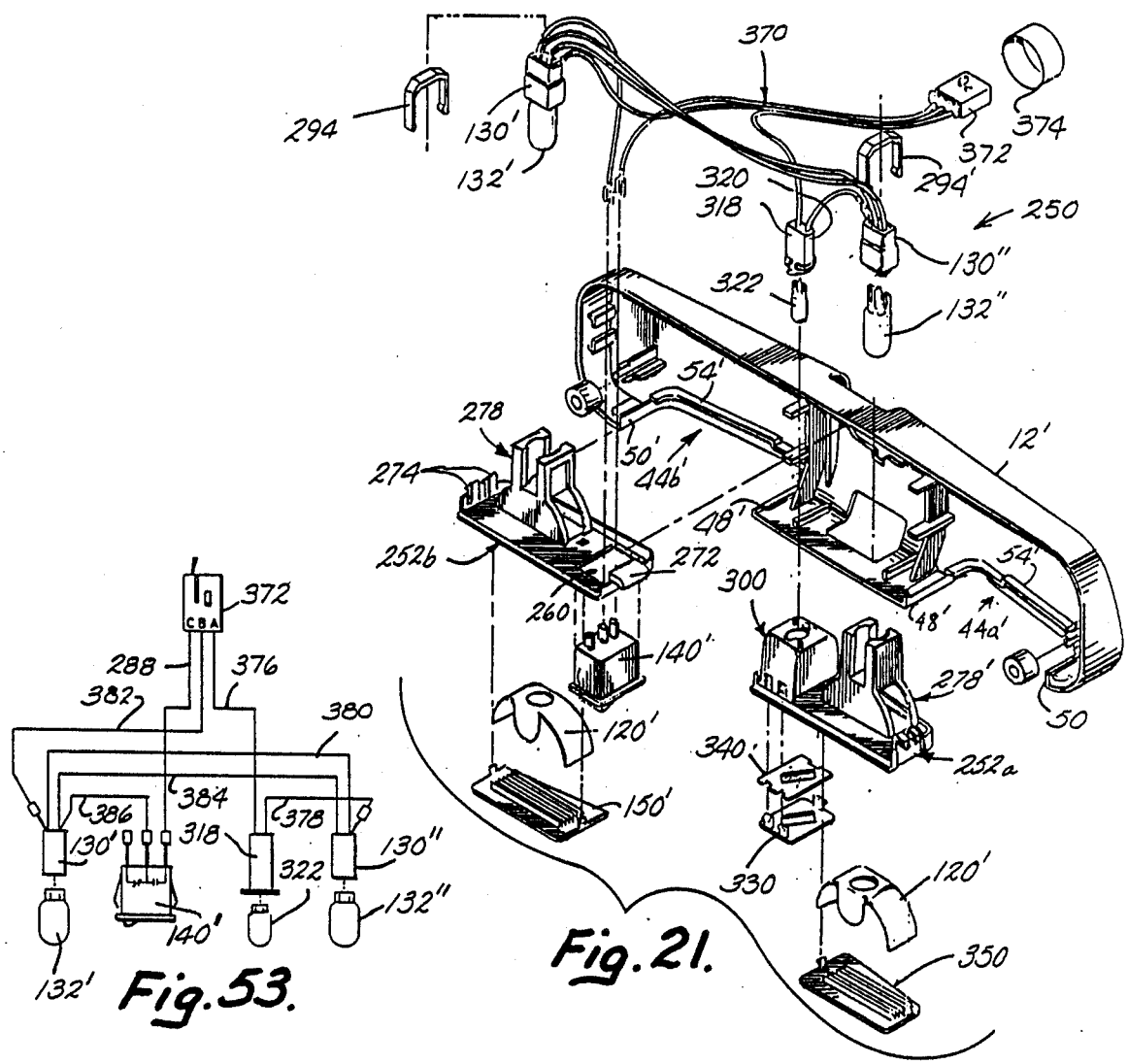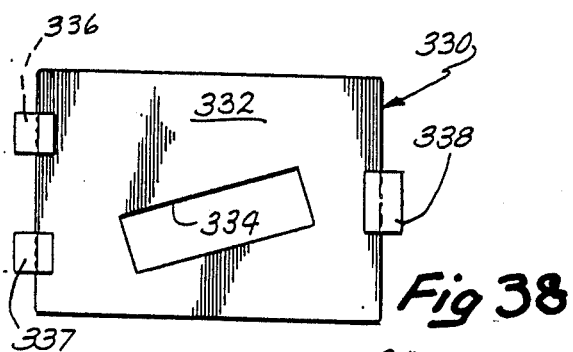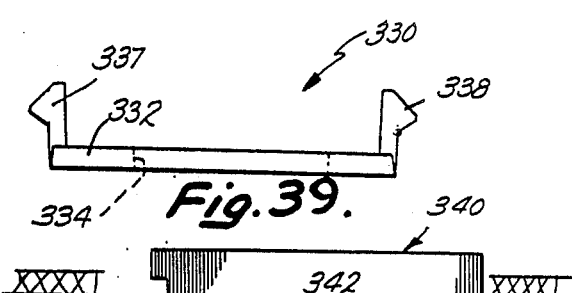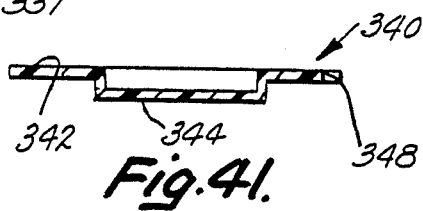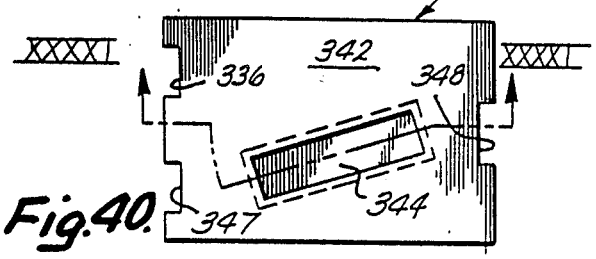

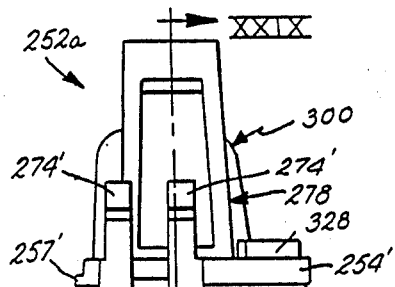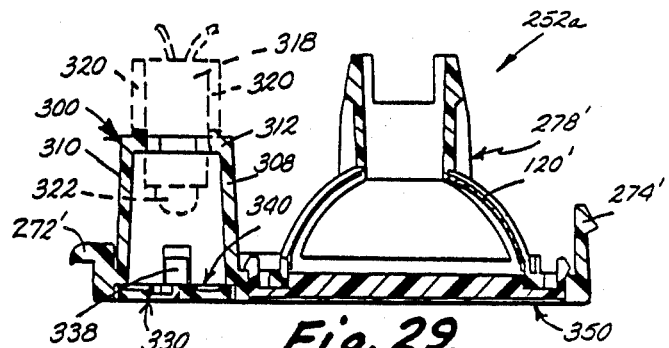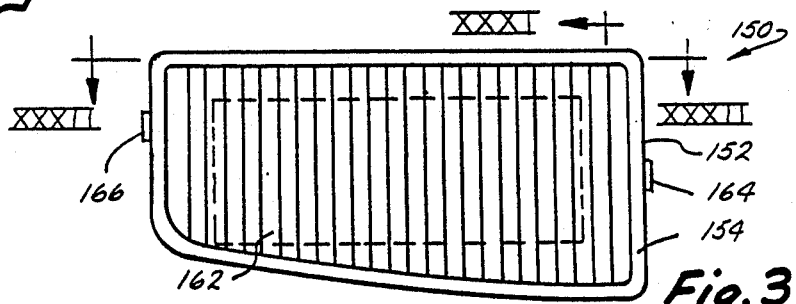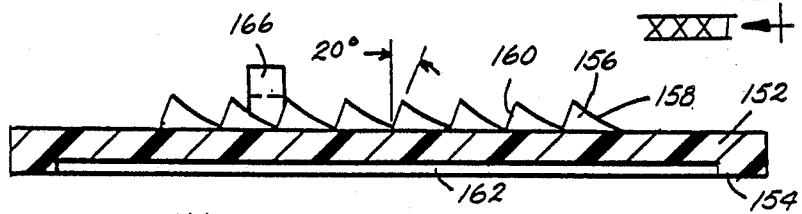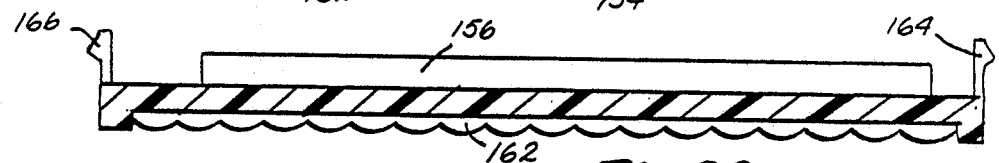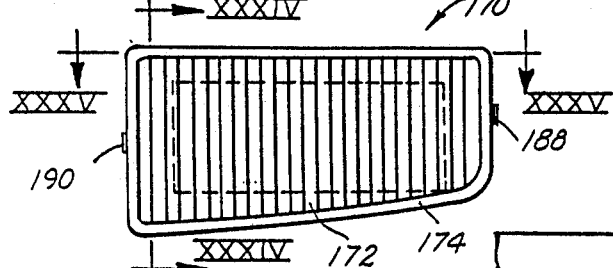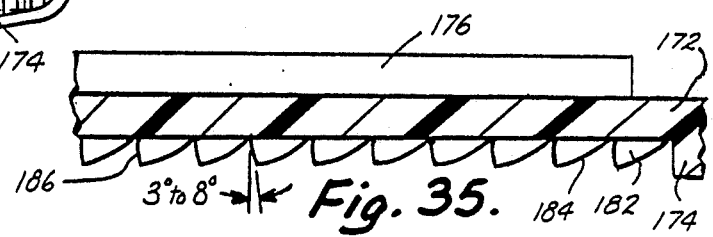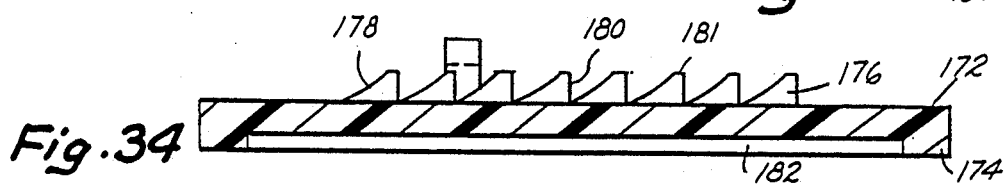

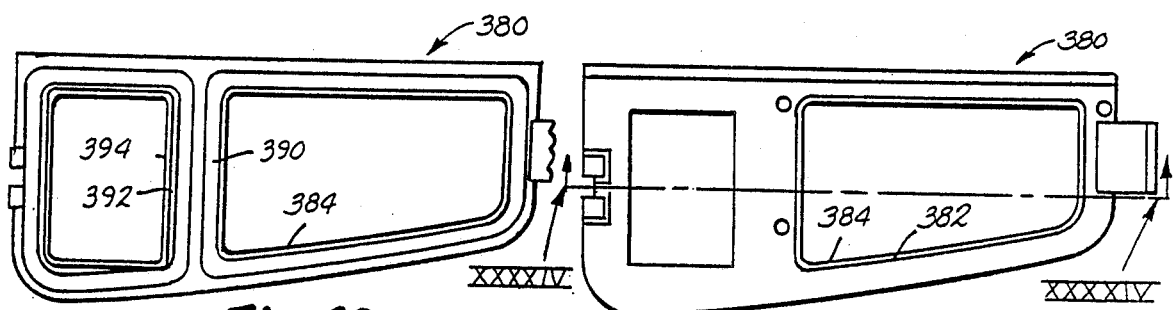
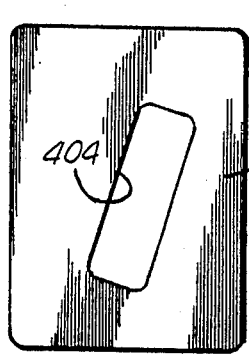
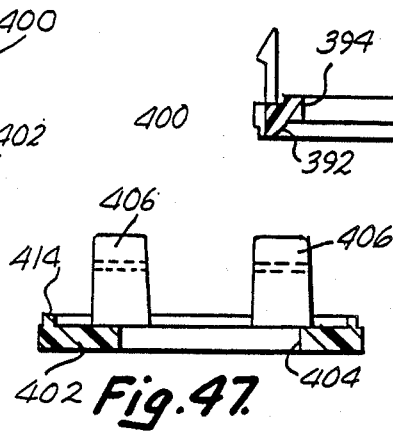
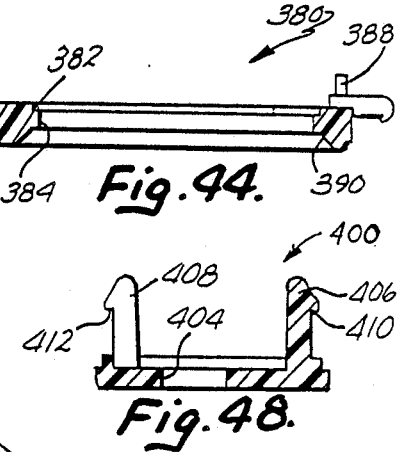
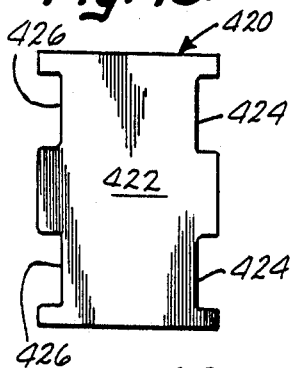
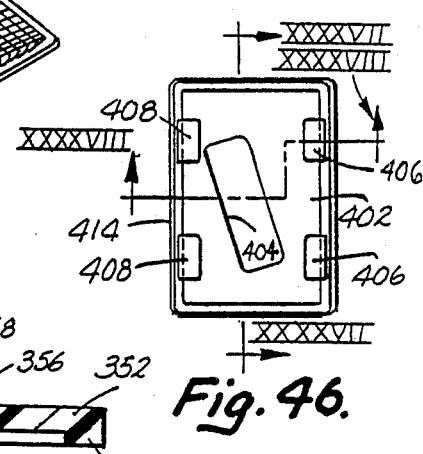

INTERIOR LIGHT/CARRIER MODULE FOR VEHICLES

CROSS-REFERENCE TO RELATED APPLICATION

This is a continuation of Ser. No. 879,158, filed June 26, 1986, now U.S. Pat. No. 4,733,336 issued June 26, 1986.

BACKGROUND OF THE INVENTION

This invention relates to rearview mirror assemblies for vehicles and, more particularly, to a rearview mirror case assembly which provides lights for illuminating selected portions of the vehicle interior in which the assembly is mounted or displays various types of information and includes controls mounted within the assembly for providing such information.

Various types of rearview mirror assemblies including lights or information providing units therein have been used in the past. One such structure includes a housing secured to the back of a rearview mirror case and having a pair of light assemblies mounted on the housing for insertion into the case through openings in the case back such that light is directed downwardly of the assembly from the spaced lights. The lighting provided was appropriate for low level interior courtesy lighting for the front passenger area of a vehicle. The housing of this prior mirror assembly wrapped around the case back to the bottom of the case and was, in part, visible by the driver of the vehicle. Moreover, adaptability of this assembly to provide various types of lights or support for other controls or information display units desired for use within the vehicle was difficult because of space limitations and the required attachment structure for the housing.

The above prior mirror assembly also revealed a need to incorporate the support of the light units more wholly within the mirror case so as to integrate them more pleasingly with the overall mirror design. Coupled with such desire was a need to provide improved lighting which could not only provide general light level illumination within the vehicle, but also provide specific targeted light areas for use in illumination of the console between the front seats of a vehicle, for map reading in the front seats by the driver or front passengers, and would also provide increased light intensity over prior known structures. In addition, a mirror assembly was desired which would reduce as much as possible any glare visible by the vehicle driver and prevent the visibility by the driver of any light source from the light assemblies within the structure.

The present invention was conceived as a solution for and an improvement over the above and other design limitations of prior known lighted rearview mirror structures. It was also conceived as a means for providing a basic structure which would be interchangeably fitted with various types of lights, instruments, or controls of an electronic or other nature by making relatively minor part substitutions which could be fitted within the basic mirror assembly to accommodate various vehicle designs and design concepts.

SUMMARY OF THE INVENTION

Accordingly, the present invention provides the case assembly for vehicular rearview mirrors adapted to support lights for illuminating portions of the vehicle interior, instruments such as directional compasses or the like, sensing units to provide information concerning engine or vehicle operation parameters, or other controls such as switches or instrument adjustment units. The basic case assembly may be interchangeably fitted with a variety of carrier modules having different combinations of lights, switches, instrument controls and the like.

In one form, the invention is a case assembly for a vehicular rearview mirror including a mirror case having a back, a peripheral sidewall defining a front opening adapted to receive a mirror element, the peripheral sidewall including top, bottom and end wall portions and a back spaced from the front opening to define an interior space within the case. Means are provided for mounting a case on a support. An opening in the bottom wall portion receives carrier means supporting light, a control, an instrument or the like within said interior space, the carrier means including a rigid support and mounting means for mounting the support within the opening such that the support is generally flush with the exterior of the bottom wall portion.

Preferably, the carrier means is a carrier module supporting one or two lights, a light and an electrical switch, or a control unit for controlling the operation of an instrument such as a directional compass, sensing unit or the like wherein a control element extends from the carrier module for access from the bottom of the case assembly.

In another form of the invention, a pair of the carrier modules are secured within the bottom wall of the mirror case on either side of a central securing means for mounting the case on a support. Each module may include a light assembly or a light assembly and a switch. In another combination, one of the carrier modules may include a pair of lights while the other carrier module may include either a light assembly with a switch or control means for adjusting and controlling the operation of an instrument such as a directional compass. Thus, the present invention provides design flexibility via interchangeable carrier modules which may be substituted for one another to provide varying features with the basic mirror assembly as desired by manufacturers and customers.

In yet another aspect of the invention, the invention includes a case assembly with a mirror case having means for receiving a mirror element, a case back, a peripheral sidewall having lateral ends and means for supporting the assembly in a vehicle. Lighting means are included for illuminating areas adjacent the assembly along with support means for supporting lighting means on the mirror case. Light directing means are included for directing light from the lighting means to illuminate first and second areas below and outwardly of either lateral end of the case with a first amount of light. Each of the first and second areas includes a targeted area of brighter, more intense light therewithin. The targeted areas are directed and positioned such that they generally illuminate the lap areas of persons seated in the front seats of a vehicle with the case assembly mounted in a normal driver viewing position generally above the instrument panel of the vehicle.

Preferred forms of the invention may include various types of light assemblies including a lamp socket, a parabolic reflector for directing light from the socket, an electric lamp, a lens mounted below the lamp socket, reflector and lamp for directing the light, and removal means accessible from the bottom of the case assembly for allowing removal of the carrier modules from their openings.

The present invention provides numerous advantages over prior known lighted or instrument carrying rearview mirror assemblies. First, the assembly provides significant design flexibility due to the interchangeability of various carrier modules which can support varying types of instruments including light assemblies, switches, control units and the like to provide illumination within the vehicle or control of instruments having readouts displayed on the assembly. In addition, the invention provides improved lighting which may not only be directed to diverging areas to properly illuminate the lap areas of the driver and passenger in the front of a vehicle for map reading or the like, but also to illuminate the console area between the front seats. The lights may be controlled from the mirror assembly itself and/or from the instrument panel of the vehicle. The invention also provides improved light intensity which may be specifically directed with included lens designs.

The interchangeability of the carrier modules enables the basic case assembly to be used for various types of vehicles with alternate carrier modules simply substituted in the bottom openings of the case assembly to modify the case to include various types of instruments, lights or the like. In addition, safety and vision for drivers is improved since the invention prevents any light from directly entering a driver's field of view while properly directing the light to desired areas. This results in decreased glare and increased contrast for the driver's eyes thereby providing better night vision. Further, the overall styling and appearance of the rearview mirror case assembly is significantly improved by the integration of the carrier modules such that they are mounted generally flush with the bottom wall of the case and are essentially hidden from view when the mirror is viewed from the normal driving position.

These and other objects, advantages, purposes and features of the invention will become more apparent from a study of the following description taken in conjunction with the drawings.

BRIEF DESCRIPTION OF THE DRAWINGS

FIG. 6 is a front elevation of the left half of the mirror case of the mirror assembly of FIGS. 1-5;

FIG. 7 is a bottom view of the right half of the mirror case shown in FIG. 6;

FIG. 8 is a top plan view taken from the interior side of a first embodiment of a carrier module for the present invention;

FIG. 9 is a side elevation of the carrier module of FIG. 8;

FIG. 10 is an end elevation of the carrier module of FIGS. 8 and 9;

FIG. 11 is a sectional view of the carrier module of FIGS. 8-10 taken along line XI—XI of FIG. 8;

FIG. 12 is a sectional view of the carrier module of FIG. 8 taken along line XII—XII of FIG. 8;

FIG. 13 is a sectional view of another portion of the carrier module of FIG. 8 taken along line XIII—XIII of FIG. 8;

FIG. 20 is a bottom view of a second embodiment of the lighted rearview mirror of the present invention;

FIG. 21 is an exploded perspective view of the rearview mirror assembly of FIG. 20;

FIG. 22 is a bottom plan view of the left carrier module of the assembly of FIG. 20;

FIG. 23 is a top plan view of the carrier module of FIG. 22;

FIG. 24 is an end elevation of the carrier module of FIGS. 22 and 23;

FIG. 25 is a side sectional view of the carrier module including a light socket thereon and with a reflector, lens and switch mounted on the carrier module of FIGS. 22-24;

FIG. 26 is a top plan view of the right hand carrier module of the rearview mirror assembly of FIG. 20;

FIG. 27 is a bottom plan view of the carrier module of FIG. 26;

FIG. 28 is an end elevation of the carrier module of FIGS. 26 and 27;

FIG. 29 is a side sectional view of the carrier module of FIGS. 26-28 assembled with a reflector, lenses and lens holder;

FIG. 30 is a bottom plan view of the left hand lens used with the rearview mirror assemblies of FIGS. 1-5 and 20-25;

FIG. 31 is a sectional end view of the lens of FIG. 30 taken along line XXXI—XXXI of FIG. 30;

FIG. 32 is a sectional side view of the lens of FIG. 30 taken along line XXXII—XXXII of FIG. 30;

FIG. 33 is a bottom plan view of the right hand lens used with the rearview mirror assembly of FIGS. 1-5;

FIG. 34 is an end section of the lens taken along line XXXIV—XXXIV of FIG. 33;

FIG. 35 is a partial side section of the lens taken along line XXXV—XXXV of FIG. 33;

FIG. 36 is a sectional end view of an alternative lens for use with the right hand carrier module of the rearview mirror assembly of FIGS. 20 and 21;

FIG. 37 is a sectional side view of the alternative lens of FIG. 36;

FIG. 38 is a plan view of a lens holder for the second light assembly on the right hand carrier module of the rearview mirror assembly of FIGS. 20 and 21;

FIG. 39 is a side elevation of the lens holder of FIG. 38;

FIG. 40 is a plan view of a lens used with the lens holder of FIGS. 38 and 39;

FIG. 41 is a side sectional view of the lens of FIG. 40 taken along line XLI—XLI of FIG. 40;

FIG. 42 is a bottom plan view of an alternative third carrier module which may be used with either the rearview mirror assembly of FIGS. 1–5 or 20 and 21;

FIG. 43 is a top plan view of the carrier module of FIG. 42;

FIG. 44 is a side section of the carrier module of FIGS. 42 and 43;

FIG. 45 is a bottom plan view of an alternative lens holder for use with the second light opening on the carrier module of FIGS. 42-44;

FIG. 46 is a top plan view of the lens holder of FIG. 45;

FIG. 47 is a sectional side view of the lens holder of FIGS. 45 and 46;

FIG. 48 is a sectional end view of the lens holder of FIGS. 45 and 46;

FIG. 49 is a plan view of a lens for use with the lens holder of FIGS. 45-48;

FIG. 50 is a perspective view of an alternative lens for use with the primary light opening in the carrier module of FIGS. 42-44;

FIG. 53 is a schematic wiring diagram for the rearview mirror assembly of FIGS. 20 and 21.

DESCRIPTION OF THE PREFERRED EMBODIMENTS

Figure 3:
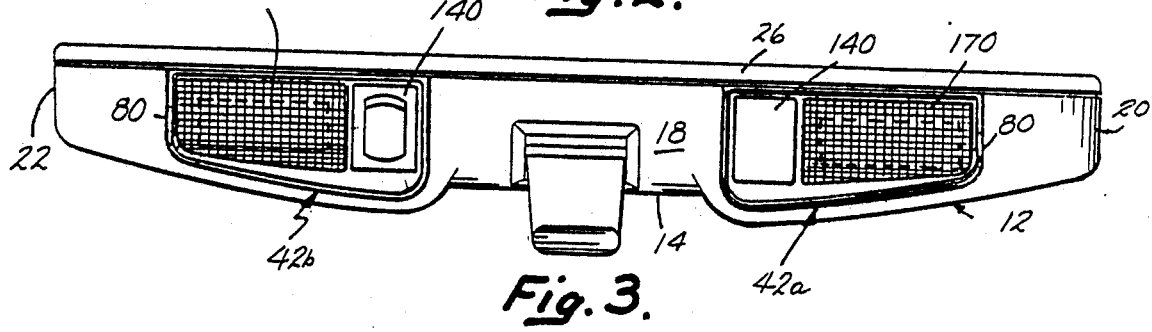
FIG. 3 is a bottom view of the rearview mirror assembly of FIG. 1.
Figure 4:
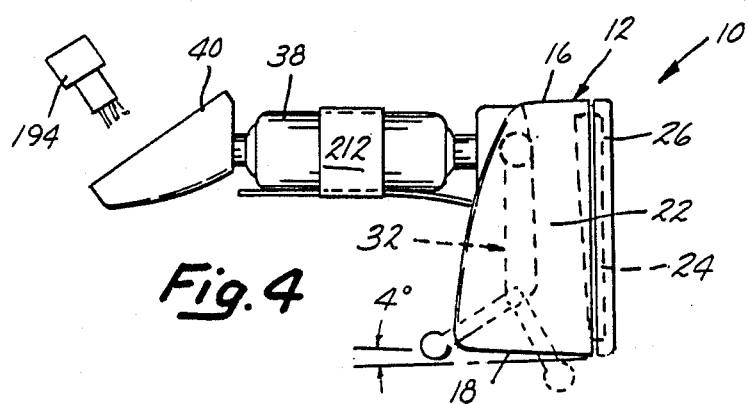
FIG. 4 is a side elevation of the rearview mirror assembly of FIGS. 1 and 3.
Figures 5, 52:
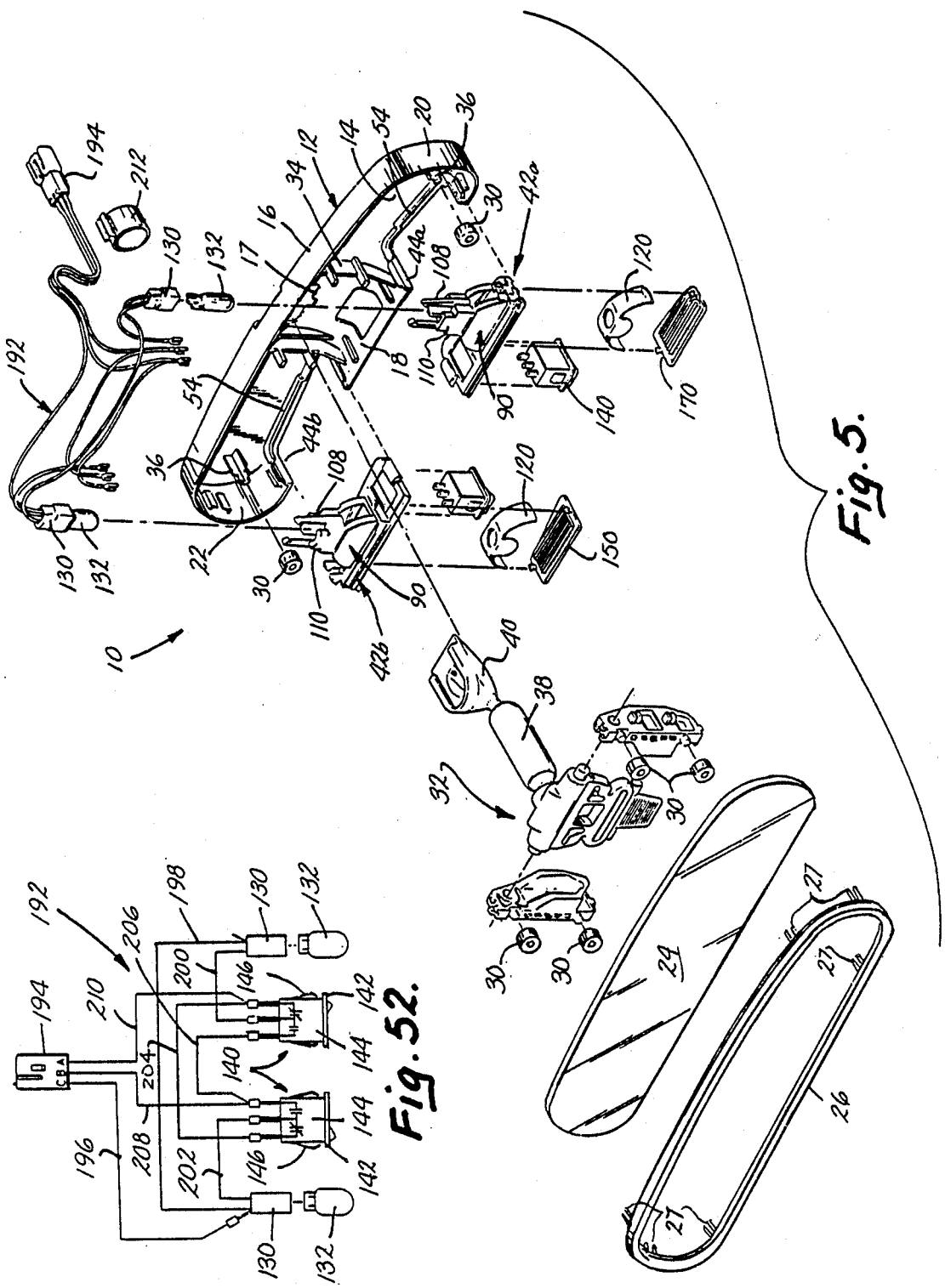
FIG. 5 is an exploded, perspective view of the rearview mirror assembly of FIGS. 1-4.
FIG. 52 is a schematic wiring diagram for the rearview motor assembly of FIGS. 1–5.

Referring now to the drawings in greater detail, FIGS. 1–5 illustrate a first embodiment 10 of the rearview mirror assembly of the present invention. Mirror assembly 10 includes a molded thermoplastic case 12 of hollow configuration including a peripheral sidewall 15 including top wall 16, bottom wall 18 and lateral end wall portions 20, 22. The peripheral sidewall 15 spaces the mirror back 14 away from a front opening to the case adapted to receive a glass, plastic or other prismatic mirror element 24 held in place by a surrounding frame or bezel 26. Bezel 26 is secured by prongs or projections 27 (FIG. 5) received in mounting brackets 28 spaced around the interior of the peripheral wall of the case. Although preferably ultrasonically welded by prongs 27 to brackets 28, bezel 26 alternately may be adapted to be snap-fitted into place. Mirror element 24 is held tightly against rubber stops or cushions 30 (FIGS. 2 and 5) some of which are mounted on a day/night toggle assembly 32 which is secured on mounting ribs 34 which extend transversely across the interior of the case back 14 (FIGS. 5–7). Rubber cushions 30 are also included on mounting posts 36 which extend outwardly from case back 14 as shown in FIG. 5. Accordingly, the mirror element 24 is held securely in place and cushioned to avoid undue vibration from road shocks and the like when mounted with frame bezel 26.

Figure 19:
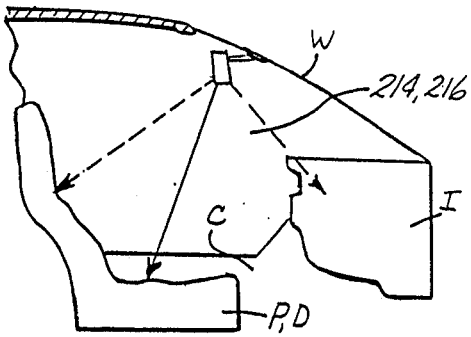
FIG. 19 is a schematic side elevation of the lighted areas of the front seat area of a typical vehicle provided by the rearview mirror assembly of FIGS. 1-5.

Toggle assembly 32 includes an outwardly extending ball member forming a part of adjustable double ball mounting bracket 38 including a mounting channel member 40 for attaching the toggle assembly, and thus the entire mirror assembly, to a windshield mounting member on the interior surface of a windshield W over the dashboard or instrument panel area I of a vehicle as shown in FIG. 19. Toggle assembly 32 is of the type described in co-pending, commonly assigned, U.S. patent application Ser. No. 879,099, entitled DAY/NIGHT REARVIEW MIRROR ASSEMBLY AND PIVOT ACTUATOR THEREFOR, invented by Kenneth Schofield and filed on even date herewith, the disclosure of which is hereby incorporated by reference herein. The details of toggle assembly 32 and its mounting within the case form no part of the present invention.

Referring now to FIGS. 1–3, 5–7 and 8–13, a pair of carrier modules 42a, 42b, which are mirror images of one another and which provide lighting assemblies for illuminating portions of the vehicle interior in which the mirror assembly 10 is mounted, are illustrated. Carrier modules 42a, 42b are received in elongated, generally trapezoidal openings 44a, 44b in bottom wall 18 provided on the left and right hand sides of the mounting area including ribs 34 for day/night toggle assembly 32 in the center of case 12. Openings 44a, 44b are also mirror images of one another and include parallel side edges 46, 47 which include upstanding walls or ribs 48, 50 adjacent thereto (FIGS. 6 and 7). Spaced above the rear edge 52 of each opening 44a, 44b is a retaining flange 54 extending outwardly from the inner surface of back wall 14 and following the contour of the outline of the opening. Flange 54 extends beyond edge 52 of each opening such that it forms a stop or wall against which carriers 42a, 42b are engaged to position the carrier modules flush with the exterior surface of bottom wall 18 as shown in FIGS. 1–4. In addition, retaining flange 54 is stepped to conform to the configuration of each carrier module as will be seen from FIGS. 9 and 11.

As shown in FIGS. 8–13, each of the carrier modules 42a, 42b, of which module 42a is shown as an example, includes a rigid body or support having a generally trapezoidal outline conforming to the shape of openings 44a, 44b including a rectilinear front edge 56, a curved rear edge 58 and opposing, parallel end edges 60, 62. Extending generally parallel to front edge 56 is a rectangular light opening 64 which extends through the thickness of the carrier module body and communicates with a lens receiving recess 66 on the exterior side of the carrier module. A second rectangular light or switch opening 68 extends generally transverse to front wall 56 on a surface of the module body which is recessed below the surface including opening 64. Opening 68 communicates with a lens or switch receiving recess 70 separated from recess 66 by divider wall 72. The entire carrier module is outlined on its exterior surface by a raised flange or rib 74.

One end of each carrier module 42a, 42b is provided with an L-shaped mounting flange 76 which fits over the top edge of wall 48 inside opening 44. On the opposite end 60 of the carrier module are a pair of upstanding, resilient flange projections or prongs 78 adjacent a narrow slot 80 providing an access for a screwdriver blade or other tool for removal of the carrier module when desired from the case 12. Flange projections 78 engage case wall or rib 50 and have inclined surfaces such that, after flange 76 is inserted over wall 48, the opposite end 60 of carrier module 42 may be cammed into place with resilient flange projections 78 sliding and bending over walls 50. When removal is desired, a screwdriver blade or other tool is inserted in slot 60 to bend projections 78 inwardly toward the center of module 42 such that the inclined undersurfaces of flanged projections 78 may be cammed downwardly over wall 50 to allow sliding removal of the carrier module.

A pair of lens securing apertures 82, 84 are included adjacent either end of opening 64 while a series of four cylindrical mounting pegs 86 are spaced adjacent each corner of opening 64 for receiving a light socket assembly 90 as explained hereinafter. The interior sidewalls of recess 66 include a pair of opposed, lens retaining projections 88 spaced below the bottom of recess 66 by a distance slightly more than the thickness of a lens to be received in recess 66. Further, a shoulder 89 is provided along the top of front edge 56 for engagement by a portion of frame bezel 26 when received in case 12. Together with flange 54, shoulder 89 helps support carrier module 42a in its flush position in the bottom wall of the case. Preferably, carrier modules 42a, 42b are molded from a heat resistant, thermoplastic material such as a mineral-filled nylon or other polymeric material. One suitable material is a mineral-filled nylon sold as MINLON 22C by E. I. Dupont de Nemours and Company of Wilmington, Del.

Figure 14:
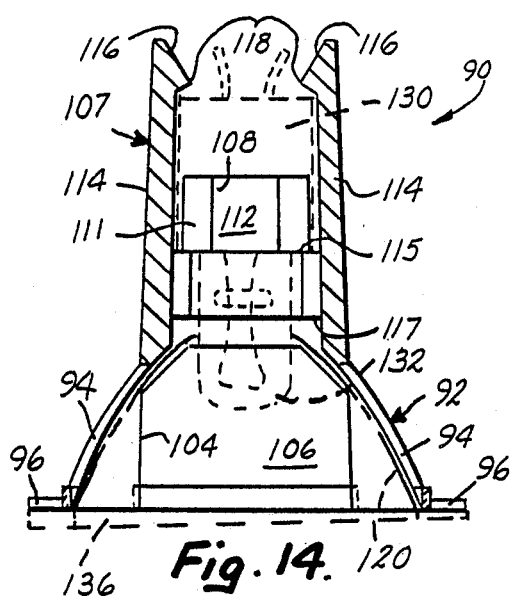
FIG. 14 is a sectional, side elevation of a light socket assembly adapted for mounting on the carrier module of FIGS. 8-13.
Figure 15:
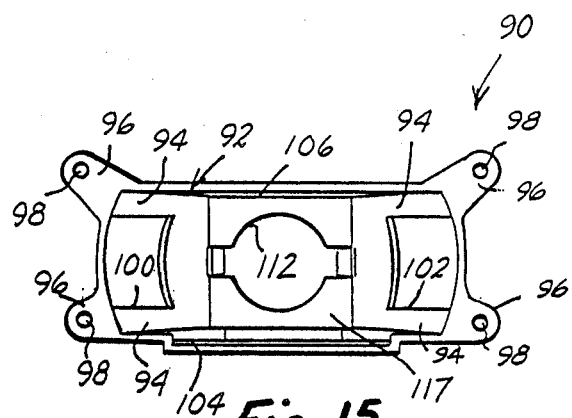
FIG. 15 is a top plan view of the light socket assembly of FIG. 14.

As shown in FIGS. 14 and 15, each carrier module 42 receives a molded, thermoplastic light socket assembly 90 over mounting pegs 86 such that they are aligned and in registry with light openings 64. Light socket 90 includes a reflector receiving basket portion 92 formed by curved, downwardly diverging legs 94 which extend into planar feet 96 each including an aperture 98 for receiving one of the mounting pegs 86. Legs 94 define curved openings 101, 102 and 104 on three sides of the reflector basket 92 with the fourth side 106 being solid. When received in case 12, side 106 faces toward mirror 24 to help block heat transfer toward the mirror from the lights in socket 90. The interior surface of reflector basket 92 defines the shape of a parabola and is adapted to receive a stamped, metallic parabolic reflector 120 as described below.

Extending upwardly from reflector basket 92 is a lamp holder 107 including spaced, upstanding walls 108, 110 (FIG. 5) defining a cylindrical bulb aperture 112 extending through a base 111 and communicating with the reflector receiving recess inside reflector basket 92. Extending upwardly adjacent the opening between walls 108, 110 are a pair of resilient, flanged lamp holder retaining projections 114 each of which include inclined camming surfaces 116 for allowing the insertion of a lamp base such as that shown at 130 in FIG. 14. Each of the projections 114 includes a flange 118 for retaining the lamp base 130 in place between walls 108, 110 and against the top surface 115 of base 111. Preferably, each lamp socket 90 is injection molded from a suitable thermoplastic resinous material such as a mineral-filled nylon, one suitable type being MINLON 22C available from Dupont.

Figure 16:
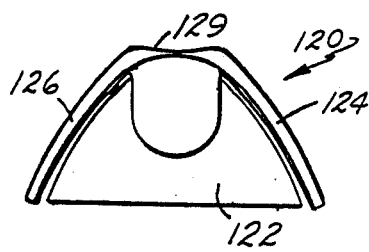
FIG. 16 is a side elevation of a parabolic reflector to be received within the light socket assembly of FIGS. 14 and 15.
Figure 17:
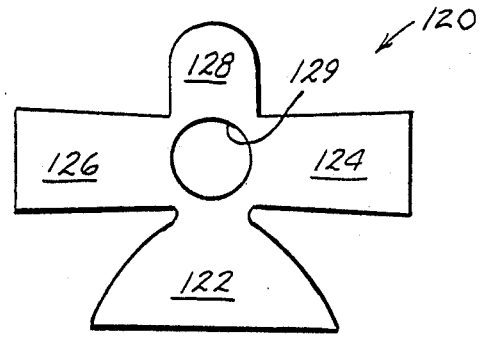
FIG. 17 is a layout of the sheet metal stamping from which the parabolic reflector of FIG. 16 is formed by bending.

As shown in FIGS. 16 and 17, each of the lamp sockets 90 receives a metallic, parabolic reflector stamped from sheet metal and polished on its inner surface to preferably reflect approximately 80% of the light generated by a bulb or lamp 132 held in the lamp socket 90. The sheet metal from which the reflector is made is preferably a bright dipped, anodized aluminum alloy. As shown in FIG. 17, the sheet metal is stamped to form reflector 120 and includes a solid side 122, a pair of opposed, curved end flanges 124, 126 and a side tab 128 which partially closes the side opposite solid side 122. A circular aperture 129 is formed at the center and top of the converging flanges. When bent and formed, reflector 120 has the shape of a parabola having one partially opened side into which tab 128 extends. Tab 128 partially shields the interior of reflector basket solid sidewall 106 from the heat from lamp 132 and also serves as a heat sink as does the entire reflector. Ends 124, 126 are curved to match the shape of the interior surface of reflector basket 92 with the top of the reflector adapted to engage or fit closely adjacent the undersurface 117 of base 111 between the reflector basket and lamp holder in lamp socket 90. In such position, aperture 129 is aligned and in registry with lamp aperture 112 such that when a lamp holder 130 is mounted in lamp socket 90 as shown in FIG. 14, a lamp or bulb held in that lamp holder will project through lamp aperture 112 and aperture 129 in the reflector to position the filament of the bulb approximately at the focal point of the reflector ends 124 and 126 (FIG. 14). The free ends of side 122 and end flanges 124, 126 are coterminous with one another and with legs 94 such that reflector 120 terminates flush with feet 96 on light socket 90. Accordingly, reflector 120 serves as a liner for the reflector recess in reflector basket 92 of light socket 90 and directs light from a lamp projecting through aperture 129 downwardly and outwardly of the carrier module through light opening 64.

In order to help direct light, a wedge or spacer 136, which may include an aperture for light passage, may be inserted between lamp socket 90 and carrier module 42 (FIG. 14). The axis of reflector 120 and lamp 132 may thus be positioned inwardly, outwardly, forwardly or rearwardly as desired.

Figure 1:
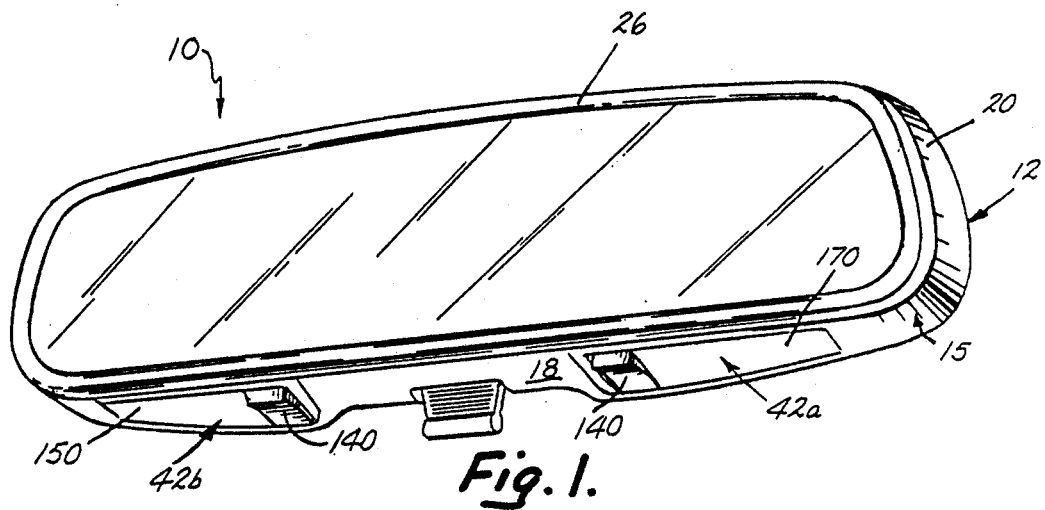
FIG. 1 is a perspective view of a first embodiment of a lighted rearview mirror assembly incorporating the present invention.
Figure 2:
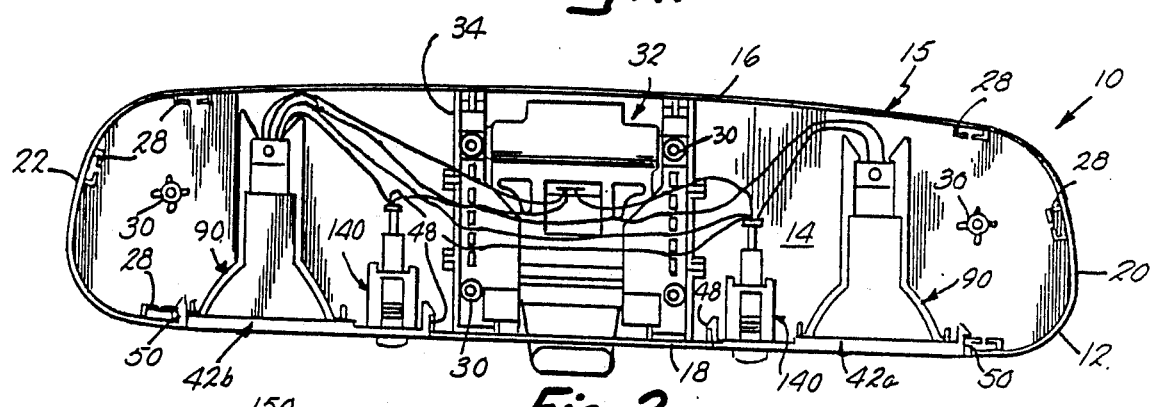
FIG. 2 is a front elevation of the rearview mirror assembly of FIG. 1 with the mirror element and front retaining bezel removed.

As shown in FIGS. 1, 3 and 5, each opening 68 in carrier modules 42 in assembly 10 is adapted to receive a rocker switch assembly 140 (FIGS. 5 and 52). Each rocker switch assembly includes a rectangular base 142 adaptd to be received in recess 70, an upwardly projecting switch unit 144, including a series of wire terminals, and a pair of resilient mounting flanges 146 adapted to engage the edge of opening 68 to retain the switch in place when snapped through opening 68.

With reference to FIGS. 11, 13 and 30-35, each of the carrier modules 42 also receives a light directing lens in its lens receiving recess 66. Left hand carrier module 42b receives lens 150 shown in FIGS. 30-32 while right hand carrier module 42a receives lens 170 shown in FIGS. 33-35. Each of the lenses 150, 170 has a configuration adapted to match the interior shape of recess 66. Lens 150 includes a lens body 152 molded from a clear polycarbonate material such as that sold under the trademark LEXAN by General Electric Co. of Pittsfield, Mass. and a surrounding lip 154 on its bottom surface. The top surface of lens body 152 includes a series of lens sections or prisms 156 formed in a rectangular area (FIG. 30). Each prism 156 is generally triangular in section having a preferred height of 0.030 inches and width of 0.060 inches but includes a radiused surface 158 having a preferred radius of 100 to 118 inches and a planar surface 160 extending at a preferred angle of 20 degrees to the vertical. The undersurface of lens 150, which faces the exterior of the carrier module, includes a series of rounded lens sections 162 extending rectilinearly in a direction transverse to the direction of the extension of rectilinear lens sections 156 on the top surface of the lens. Lens sections 162 fill the recess defined by lip 154 on the underside of the lens. Each of the rounded lens sections 162 has a preferred radius of 0.078 to 0.080 inches, a preferred height of 0.006 inches and a width of 0.060 inches. Lens body 162 also includes a pair of resilient mounting projections 164, 166 on either end for insertion in mounting apertures 82, 84, respectively, of the carrier modules.

As shown in FIGS. 33-35, right hand lens 170 has a similarly configured lens body 172 including a downwardly projectig lip or flange 174, a series of rectilinear lens sections 176 on its top surface and a series of rectilinear lens sections 182 on its bottom surface inside the recess defined by lip 174. Upwardly extending, prism-like rectilinear lens sections 176 are provided in a rectangular area shown by the dotted line in FIG. 33. Each lens section 176 is a truncated prism having a radiused surface 178, a vertical surface 180 and a flat surface 181. Preferably, each of the radiused surfaces 178 has a radius of 138-200 inches while each of the sections is 0.025 to 0.038 inches in height and 0.060 inches in width. The bottom lens sections 182 extend transverse to the direction of extension of lens section 176 as shown in FIG. 33 and are also prismatic sections unlike the rounded lens sections 162 in lens 150. Lens sections 182 include radiused surfaces 184 and 186, surfaces 186 extending at a preferred angle of three to eight degrees from the vertical as shown in FIG. 35 and having a radius of 20 inches. Surfaces 184 extend at a preferred angle of 69° 30' from the vertical and have a preferred radius of 273 inches. Like lens 150, lens 170 also includes mounting projections 188, 190 identical to those mounting projections 164, 166 in lens 150 for mounting the lens in a carrier module 42.

As shown in FIGS. 3, 5 and 11, lens 150 is adapted to be telescoped into recess 66 of left hand carrier module 42b such that mounting projections 164, 166 engage apertures 82, 84. Lens 170 is telescoped into the similar recess 66 in right hand carrier module 42a such that projections 188, 190 engage apertures 82, 84. When so mounted, retaining projections 88 engage the undersurface of flange or lip 154 or 174 to securely retain the lens against the bottom surface of the recess. In such position, each lens is aligned with the bulb and parabolic reflector and directs and focuses the light downwardly and outwardly of the ends of the lighted rearview mirror in the pattern shown in FIGS. 18 and 19.

Electrical connections within rearview mirror assembly 10 are made via wire harness 192 (FIG. 5) which includes lamp holders 130 receiving lamps 132 as mentioned above and a three wire connector 194 for connection of the harness to an external power source from the vehicle in which the mirror assembly is mounted. As shown in schematic wiring diagram FIG. 52, one side of a twelve volt direct current power source is connected through line 196 to one of the lamp bases 130 which in turn is connected by line 198 to the other lamp base 130. Lamp bases 130 are likewise connected to each of the switch units 140 by lines 200, 202 with switch units 140 being interconnected by lines 204 and 206. Lines 208 and 210 lead back to the three wire connector from the respective switch units. Accordingly, wiring harness 192 allows power to be switched to each of the lamp bases 130 independently of one another such that the driver or passenger of the vehicle can independently actuate his or her light assembly without requiring the activation of the other light assembly in the mirror assembly 10. The three wire harness 192 extends through an opening 17 (FIG. 5) in the rear of case 12, while the wires are held to the mounting bracket 38 by a resilient molded clip 212 (FIGS. 4 and 5).

Figure 18:
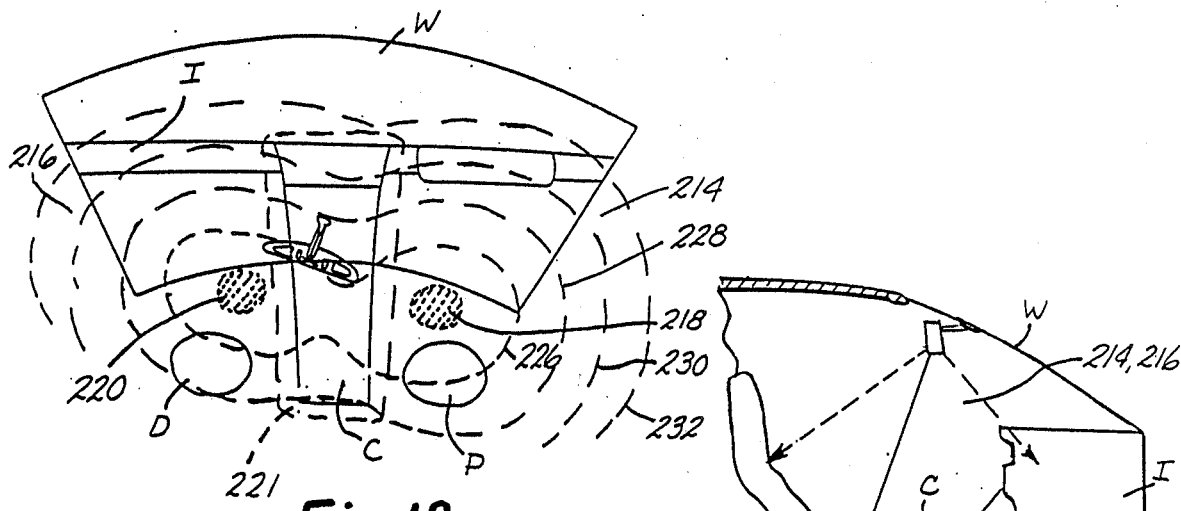
FIG. 18 is a schematic plan view of the front seat area of a typical vehicle showing the lighted areas provided by the lighted rearview mirror assembly of FIGS. 1-5.

Accordingly, as shown in FIGS. 18 and 19, when both lamps 132 in assembly 10 are switched on with switches 140, light is directed to the areas 214 and 216 downwardly and outwardly of either end of the mirror assembly which is shown in typical angled position for viewing by the vehicle driver when mounted on the windshield of a vehicle. Within each of area 214, 216, lenses 150, 170 focus and direct light to smaller, targeted areas 218, 220 which generally are positioned in the lap areas of the driver D and passenger P when seated in the left and right hand front seats of the vehicle. Intermediate targeted areas 218, 220, lighted areas 214, 216 overlap to provide a greater light intensity in the console area between the two seats over console C. Likewise, as shown in FIG. 19, the lighted areas 214, 216 extend downwardly and rearwardly from the mirror through an angle of approximately 60 degrees to cover the lap area and seat area of the front seat of the vehicle but to generally avoid lighting the dashboard or instrument panel. Preferably, with lamps 132 being wedge base lamps No. 168 available from General Electric Co. (r—3¼ bulb, 13/32 diameter) and lenses 150, 170 inserted in carriers 42a, 42b, target areas 218, 220 have a peak intensity of 70 lux. Lighted areas have a graduated, decreasing intensity as the distance from the lamps and lenses increases. Thus, iso-bar 226 in FIG. 18 represents 60 lux, iso-bar 228 represents 50 lux, iso-bar 230 represents 40 lux and iso-bar 232 represents 30 lux.

Referring now to FIGS. 20 and 21, a second embodiment 250 of the lighted rearview mirror assembly incorporating the present invention is illustrated. Assembly 250 includes the molded thermoplastic mirror case 12' substantially identical to mirror case 12 except that its shape is generally rectangular instead of trapezoidal when viewed from the front. Case 12' includes similar elements for mounting a toggle assembly 32 and similar walls and flanges for mounting carrier modules therewithin as in case 12. The primary differences between embodiment 250 and assembly 10 are the provision of differing carrier modules 252a and 252b which are mounted flush with the bottom of case 12' and described in detail below. In embodiment 250, like parts to those in embodiment 10 are referred to by the same numerals with the addition of a prime.

Referring now to FIGS. 22-25, the left hand carrier module 252b having a shape similar to carrier modules 42 and adapted to be inserted in opening 44b' (FIG. 21) of case 12' includes a molded, thermoplastic, rigid body portion 254 having a projecting lip or flange 256 on its exterior surface and a pair of rectangular openings 258, 260 spaced from one another by dividing wall 262. Apertures 258, 260 are oriented similarly to those in carrier modules 42 with aperture 258 being generally parallel to front edge 257 while the longer dimension of aperture 260 is generally parallel to end edges 259, 261 of module 252b. Like carrier module 42, the exterior surface of module 252b includes lens recesses 264, 266 surrounding apertures 258, 260 respectively. Lens mounting apetures 268, 270 extend through the bottom of recess 264 adjacent the ends of aperture 258 for receiving the mounting projections from a lens as in carrier modules 42. Similarly, a rigid, L-shaped mounting flange 272 and resilient flanged mounting projections 274 on opposite ends 261, 259 are included as in carrier modules 42 to allow mounting of the carrier module 252b within opening 44b' on case ribs 48', 50'. A rib 275 along the rear edge of module 252b engages against flange 54'. A slot 276 is provided adjacent projections 274 for receiving a tool to bend them back to allow removal of the carrier module from opening 44b'. Like modules 42, aperture 260 is adapted to receive a switch unit 140' within recess 266 from the exterior side of the carrier module, while recess 264 receives a transparent lens 150' having mounting projections inserted through apertures 268, 270 as shown in FIG. 25.

A primary difference between carrier modules 42 and 252b is the inclusion of an integral lamp socket 278 molded in one piece with the body of carrier 252b such that it extends above aperture 258. Lamp socket 278 includes curved support legs 280 defining a reflector recess 282 in the shape of a parabola for receiving a stamped, parabolic reflector of the type shown in phantom in FIG. 25 at 120'. The lamp socket defines openings on three sides of the reflector recess 282 as in lamp socket 90 and includes a series of upstanding walls 284, 286, 288 and 289 defining a cylindrical bulb aperture 290 extending generally perpendicular to the plane of aperture 258. Upstanding walls 284, 286 include recessed areas defining inclined shoulders 292 on opposite sides of the lamp socket over which is secured a resilient U-shaped retainer clip 294 also molded from a resilient thermoplastic material such as MINLON 22C. The surfaces 293 leading to shoulders 292 are inclined from the top to allow ease of insertion and spreading of the legs of clip 294. Clip 294 includes projections which engage under inclined shoulders 292 when in place as shown in FIG. 25. Lamp socket 278 is adapted to receive a lamp base 130' against the top surfaces of walls 288, 289 (FIG. 25) over which is placed the U-shaped clip 94 with its base 296 engaging the top of the lamp base to hold it in position. Bulb 132' projects downwardly through opening 290 with its filament positioned approximately at the focal point of the parabolic reflector 120' when received in reflector recess 282 with lens 150 secured in place and holding reflector 120' in that position.

Referring now to FIGS. 26–29, the right hand carrier module 252a of mirror assembly 250 is illustrated wherein like numerals with the addition of a prime indicate like parts to those in carrier 252b. The primary difference between carrier modules 252a and 252b is the inclusion of a second light socket or housing 300 which is molded in one piece with carrier body 254' and extends over rectangular opening 260' and projects inwardly into the space behind the mirror element in assembly 250 when carrier module 252 is mounted within opening 44a'. Housing 300 is generally rectangular and includes upstanding side and end walls 304, 306 and 308, 310, respectively, as well as a top wall 312 having a configured aperture 314 and a pair of opposed stops 316. Aperture 314 receives a bayonet-type lamp base 318 which includes projecting side flanges 320 which engage stops 316 when the lamp base is rotated after insertion through aperture 314. Lamp base 318 holds a lamp 322, which is smaller and produces less light than the lamps or bulbs 132, 132' in the lamp sockets 90, 278 and 278'. Housing 300 also includes a pair of mounting apertures 324 at the base of wall 304 and single mounting aperture 326 at the base of wall 306 for receiving mounting projections from a lens assembly inserted from the exterior of carrier module 252a as described below. In addition to housing 300, carrier module 250a also includes a rear wall 328 which extends along the curved rear edge of the carrier module for engagement with the underside of retaining flange 54' in case 12' when the carrier module is inserted in opening 44a' as shown in FIG. 21.

As shown in FIGS. 21, 29 and 38–40, recess 266' surrounding aperture 260' beneath housing 300 receives a rectangular lens holder 330 holding a lens 340 generally parallel to opening 260' and beneath the bulb in the housing 300. Lens holder 300 is preferably molded from a thermoplastic resinous material such as MINLON 22C and includes a generally planar base 332 having an angled rectangular aperture 334 extending therethrough for receiving a portion of the lens 340 as well as flanged mounting projections 336, 337 and 338 on opposite ends of the holder. Mounting projections 336, 337 and 338 correspond in position to apertures 324, 326 respectively in housing 300 and are sufficiently resilient and include angled surfaces to allow pressing of the lens holder into place with projections 336, 337 and 338 cammed into position in those housing apertures. For removal, those same projections may be bent backwardly by pressing the flanges thereof into the apertures and pulling the lens housing out of recess 266'.

Lens 340 rests atop the inner surface of lens holder 330 and is preferably formed from a clear polycarbonate such as LEXAN. Lens 340 includes a generally planar base 342 and a molded rectangular recessed area 344 adapted to be received within angled rectangular aperture 334 of holder 330. Similarly, lens 340 includes recesses 346, 347 receiving the sides of mounting projections 336, 337 of holder 330 and recess 348 receiving the sides of mounting projection 338. As shown in FIG. 29, lens 340 is placed atop holder 330 with recessed portion 344 received in aperture 334 and the combination is then pressed in place into recess 266' with mounting projections 336, 337 and 338 holding the combined holder and lens in place and flush with the bottom surface of carrier 252a below bulb 322 in housing 300.

As shown in FIGS. 21, 37 and 38, a light directing lens 350, which is substantially a mirror image of lens 150, is adapted to be inserted in carrier module 252a from its exterior, bottom side and is also preferably formed or molded from a clear polycarbonate such as LEXAN. Lens 350 includes a body 352, a downwardly projecting lip 254, a series of rectilinear lens sections 356 each having a radiused lens surface 358 and a rectilinear inclined surface 360. The inclined surface is preferably at 20 degrees to the vertical while surfaces 358 each have a preferred radius of 100 to 118 inches as in lens 150. Lens sections 356 define an overall rectangular shape adapted to be received in aperture 258' of carrier module 252a when lens 350 is inserted in recess 264'.

On the bottom side of lens 350 are a series of rounded lens sections 362 each of which has a preferred radius of 0.078 to 0.080 inches, a width of 0.060 inches and a height of 0.006 inches. Lens sections 362 extend rectilinearly in a direction transverse to the direction of extension of lens sections 356 just as in lens 150. When lens 350 is mounted in the right hand carrier module 252a, the combined lens sections 356, 362 bend light from bulb 132" (FIG. 21) downwardly and outwardly of the right hand end of the mirror assembly to form a general lighted area similar in shape to area 214 in FIG. 18. Similarly, lens 150' received in carrier module 252b, forms a light pattern similar to area 216 in FIG. 18.

As shown in FIG. 21, electrical energy is supplied to lamp sockets 278, 278' and lamp housing 300 by a wiring harness 370 which includes lamp bases 130'and 130", receiving lamps 132' and 132", respectively, as well as lamp base 318 receiving smaller lamp 322 for housing 300. A three wire connector 372 provides a connection to the vehicle electrical system external of the mirror assembly 250, while a clip or wire retainer 374 holds the wires which extend out of the mirror assembly against mirror adjustment bracket 38 (FIG. 4).

The preferred wiring arrangement for mirror assembly 250 is shown in FIG. 53 including wire 376 connected to one side of a twelve volt direct current power source through connector 372 and leading to lamp base 318. The circuit is completed through lamp base 318 by wire connectors 378 and 380 which lead to lamp bases 130" and 130' and ultimately back to wire connector 372 through wire 382. Thus, lamp 322 is connected to an external circuit and/or switch in the vehicle but is unswitched within wire harness 370. A typical arrangement is to connect wires 376 and 382 through connector 372 to the headlight circuit of a vehicle such that when headlights or parking lamps are turned on in the vehicle, lamp 322 will be turned on to provide light at all times when the vehicle lights are on. Since aperture 334 and lens portion 344 are angled to correspond to the normal mirror viewing angle when positioned by the driver of a vehicle, they will direct light from bulb 322 on the console area such as that shown at 221 in FIG. 18 when the vehicle headlights are on. Lamp bases 130' and 130" are connected through a single switch unit 140', with wires 384, 386 and 388 leading to connector 372 to complete the circuit such that they are controlled by switch 140' independently of the vehicle headlight circuit which controls lamp 322.

Referring to FIGS. 42-44, a third alternative carrier module 380 similar to carrier modules 42 is illustrated. Carrier module 380 includes a rigid body, mounting flanges and resilient mounting projections, light and switch unit receiving apertures, mounting pegs and an access slot for bending the mounting flanges to remove the carrier from the case all as in carrier modules 42. The primary difference between carrier modules 342 and 380 is the provision of a lens recess 382 on the interior surface of the carrier module as shown in FIGS. 43 and 44. Recess 382 outlines the periphery of light opening 384 and is adapted to receive a lens 386 (FIG. 50). Lens 386 is similar to lens 150 except that the border area around the rectangular portion defined by lens segments 156 is eliminated. Lens 386 is adapted to be received in recess 382 prior to the mounting of lamp socket 90 over the mounting pegs 388. A further difference in carrier module 380 from carrier modules 42 is the provision of inclined recess walls 390, 392 on the exterior, bottom surface of the carrier module which provide a better feel and appearance for the module when the carrier module is touched for use of the switch unit adapted to be received in aperture 394.

Alternately, carrier module 380 may receive a lens holder and lens (as shown in FIGS. 45-49) in apeture 394 instead of a switch unit. In this form, the carrier module 380 would be used with an assembly such as rearview mirror 250 in FIGS. 20 and 21. Alternative lens holder 400 is also molded from a resinous plastic such as MINLON 22C and includes a rectangular base 402, an angled light directing aperture 404 as in lens holder 330 and two pair of spaced resilient mounting projections 406, 408 projecting upwardly from the inside surface of the lens holder. Mounting projections 406, 408 include shoulders 410, 412 respectively and inclined surfaces allowing them to be cammed over the inside edges of aperture 394 in carrier 380. Shoulders 410, 412 hold lens holder 400 in place with flange 414 engaging the inside surface of the recess around aperture 394 adjacent inclined walls 392.

Fitted within wall 414 in lens holder 400 is a clear acrylic generally planar lens 420 shown in FIG. 49. Lens 420 includes a planar body 422 and two opposing pairs of recesses 424, 426 adapted to receive the sides of mounting projections 406, 408 in lens holder 400 when received within the lens recess defined by wall 414 on the inner surface of lens holder 400. Accordingly, when lens 420 is inserted in lens holder 400, the combination may be inserted in aperture 394 of carrier 380 in place of a switch unit to provide a carrier module similar to carrier module 252a in rearview mirror assemlby 250.

Figure 51:
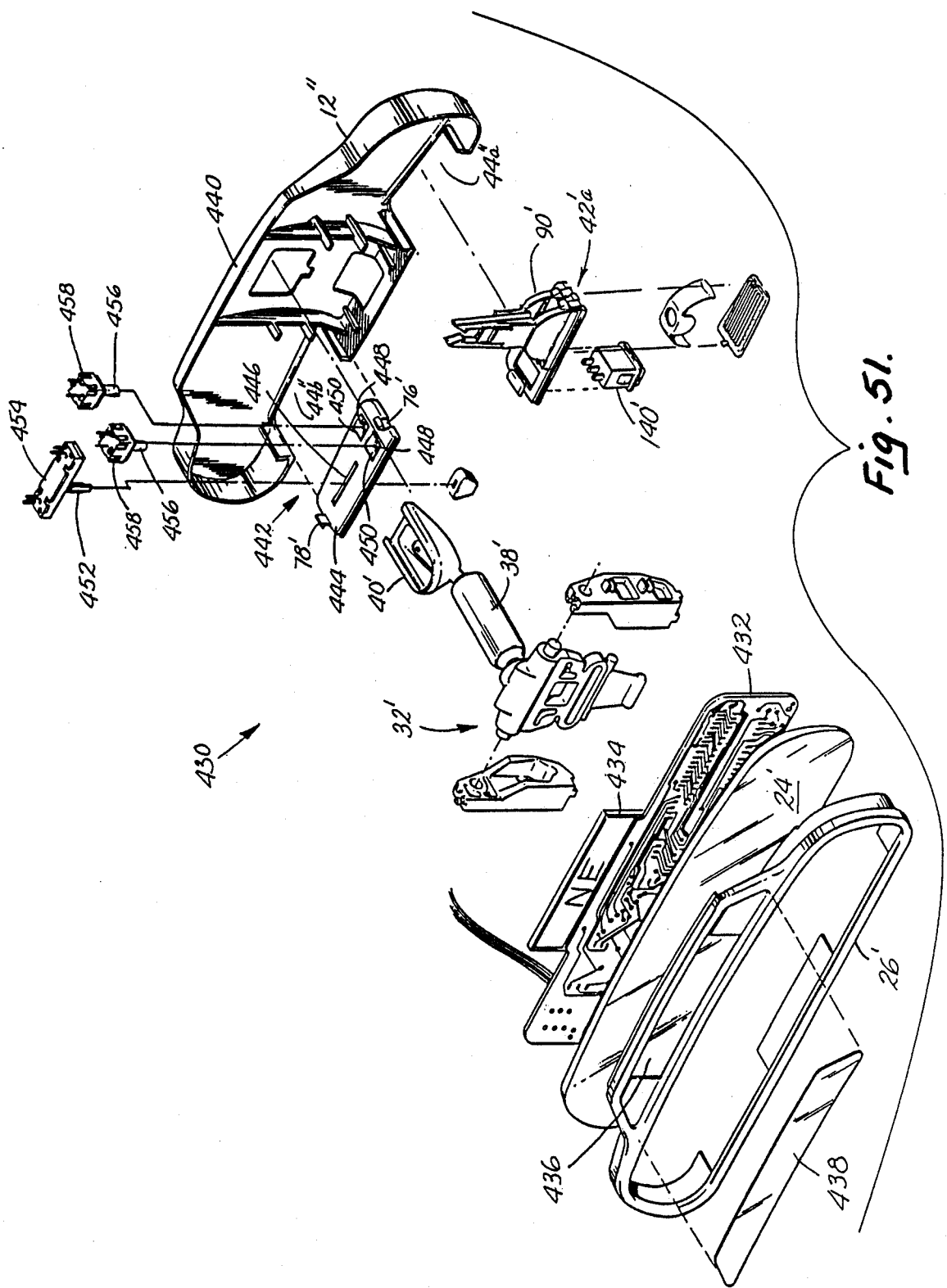
FIG. 51 is an exploded perspective view of a third embodiment of the lighted/information rearview mirror assembly of the present invention.

A third embodiment 430 of the rearview mirror assembly incorporating the present invention is shown in FIG. 51 where like parts bear like numerals to those referred to above in other assembly embodiments with the addition of a prime. Embodiment 430 incorporates an electronic directional compass including an electronic printed circuit board 432 with an upstanding display readout 434 adapted to be read through an upwardly projecting information display area 436 on the top of frame bezel 26'. Display area 436 is covered with a planar lens 438. Sandwiched between the frame bezel and the printed circuit 432 is a prismatic mirror element 24'. The combination of the frame bezel 26, mirror element 24' and printed circuit 432 is inserted into the front opening of a molded thermoplastic mirror case 12" including a contoured area 440 closing the back of the display area 436 at the top of the mirror assembly. The remainder of the molded thermoplastic case 12" is substantially similar to cases 12 and 12' as is the day/night toggle actuator 32', adjustable mounting bracket 38' and mounting channel 40'.

Instead of a pair of carrier modules on which are mounted light assemblies, right hand carrier module 42a' is the same as carrier module 42a in assembly 10. It includes a lamp socket assembly 90 mounted over a light opening in the carrier module and receives a parabolic reflector 120' andlens 170' or another lens as described herein depending on the area desired to be lighted. In addition, a switch unit 140' is inserted in a second aperture in the module 42a' just as in module 42a. When inserted in opening 44a", the mirror assembly can provide light directed downwardly and outwardly of the assembly from light socket assembly 90' as controlled by switch unit 140' through appropriate wiring (not shown) leading out the back of the mirror case in the same manner as described in the other assemblies above.

On the left hand side of case assembly 430, is a modified carrier module 442 adapted to fit in bottom opening 44b" of case 12". Carrier module 442 includes a generally planar rigid body formed from molded thermoplastic material such as MINLON 22C and includes an L-shaped flange 76' and at least one resilient mounting projection 78' and a removal slot 76' on opposite ends of the rigid body 444. Instead of including light openings, however, carrier module 442 includes a slot 446 extending generally parallel to the front edge of the module and a pair of circular apertures 448 formed in recesses 450. Slot 446 receives sliding control element 452 from a rheostat unit 454 adapted to be mounted on the inside surface of carrier module 442 to control the light intensity of the display area 434 from the electronic compass circuit 432. Also, apertures 448 are adapted to receive cylindrical, rotatable control elements 456 from potentiometer units 458 mounted in recesses 450 to control, adjust and compensate the operation of compass circuit 432. Accordingly, when rheostat 454 and potentiometers 458 are mounted on the interior surface of carrier module 442, control elements 452, 456 project downwardly from the exterior bottom surface of the carrier module and are accessible from the bottom of the mirror assembly for control purposes.

As will now be understood, the carrier modules 42, 252, 380 and 442 may be interchanged as desired to provide varying combinations of lights, switch units, instrument controls and the like in each mirror assembly. Single lights may be used with control elements as in assembly 430. Double or triple lights can be included with various switches or other controls as desired. It is also possible to mount instruments themselves on the carrier modules to provide sensing circuitry for various environmental conditions, clocks or timers, engine parameters or the like all of which may be read on display panels or other readout units mounted somewhere on the case assembly. It will also be understood that the upward slant of the bottom surface of the case assemblies as shown in FIG. 4 at a preferred angle of four degrees prevents any glare or point sources of light from being visible to the driver's eyes thereby increasing safety and preventing vision impairment for the driver when the assembly includes lighting as described above. It is also apparent that various types of molded thermoplastic or other cases can be substituted for the cases 12, 12' and 12" and that the size, shape, spacing and positioning of the openings for the carrier modules in the case can be varied as desired. In addition, it is possible to use the various carrier modules in mirror cases not including day/night toggle assemblies but rather standard mounting assemblies in which planar instead of prismatic mirror elements are included in the assembly. In addition, it is possible to eliminate all lights from the assembly and use carrier modules mounting only instruments or instrument controls if desired.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A carrier module for interior vehicular use, said module comprising:
    a rigid body having light support means for holding a light source, a lens supported adjacent said light support means, and second support means adjacent said light support means for supporting at least one of a second light, a switch, a control unit and an instrument;
    mounting means independent of said light support means and second support means for mounting said body on a support on a vehicle such that one side of said body is exposed, said mounting means including removal means accessible from said exposed side of said body for allowing removal of said body with said light support means, lens, and second support means from the vehicle support without disassembling other parts of the vehicle support.

2. The carrier module of claim 1 wherein said mounting means include resilient means adjacent said removal means for retaining said body on the vehicle support; said resilient means being accessible from said removal means for release and removal of said body from the vehicle support.

3. The carrier module of claim 2 wherein said mounting means include a support flange projecting outwardly from one end of said rigid body; said resilient means including at least one resilient projection extending from the other end of said rigid support; said removal means including slot means adjacent said resilient projection for inserting a tool to bend said projection to remove said support from the vehicle support.

4. A carrier module for interior vehicular use, said module comprising:
    a rigid body having light support means for holding a light source, a lens supported adjacent said light support means, and second support means adjacent said light support means for supporting at least one of a second light, a switch, a control unit and an instrument;
    mounting means for mounting said body on a support on a vehicle such that one side of said body is exposed, said mounting means including removal means accessible from said exposed side of said body for allowing removal of said body with said light support means, lens, and second support means from the vehicle support without disassembling other parts of the vehicle support;
    said light support means including a light assembly on the side of said rigid body which is opposite to said exposed side, said light assembly including a lamp socket, a reflector in said lamp socket for directing light through said lens, and an electric lamp in said lamp socket projecting into the interior of said reflector.

5. The carrier module of claim 4 wherein said second support means includes an electrical switch mounted thereon such that said switch is operable from said exposed side.

6. The carrier module of claim 4 wherein said second support means includes a second lamp socket adjacent the first said lamp socket, said second lamp socket including an electric lamp and a second lens for directing light from said second lamp outwardly of said module.

7. The carrier module of claim 4 including an electrical switch mounted on said second support means and wiring means for connecting said first lamp to said switch.

8. The carrier module of claim 6 wherein said first lamp is brighter than said second lamp.

9. The carrier module of claim 4 wherein said rigid body includes a light opening therethrough; said lamp socket including a hollow framework extending upwardly from said body and aligned over said light opening, said framework having curved, downwardly diverging sides defining a reflector recess; said reflector mounted within said reflector recess; and lamp holder means for supporting said lamp above said reflector recess, said lamp holder means including a lamp aperture opening into said reflector recess.

10. The carrier module of claim 9 including resilient retaining means for releasably holding said lamp and a lamp base on said lamp holder means.

11. The carrier module of claim 9 including a lens recess surrounding said light opening on said exposed side of said rigid body and lens mounting means for mounting said lens in said lens recess.

12. The carrier module of claim 11 wherein said lens mounting means includes at least one lens mounting aperture adjacent said light opening and at least one lens support projection on the wall of said recess and spaced from the bottom of said recess.

13. The carrier module of claim 9 wherein said second support means include a second opening extending through said rigid body and adjacent said light opening.

14. The carrier module of claim 13 wherein said second opening includes an electrical switch mounted therein for operating said lamp.

15. The carrier module of claim 13 including a light housing aligned with said second opening on said opposite side of said rigid body, said light housing including means for receiving a lamp base thereon; a second lens recess surrounding said second opening on said exposed side of said rigid body; and a lens in said second lens recess for directing light outwardly of said module.

16. The carrier module of claim 13 wherein each of said light opening and second opening are recessed with respect to said exposed side of said rigid body.

17. The carrier module of claim 9 including a lens recess on said opposite side of said support and outlining said light opening.

18. The carrier module of claim 4 including spacing means between said light assembly and rigid body for positioning said lamp socket, reflector and lamp with respect to said body such that light may be directed as desired.

19. The carrier module of claim 4 wherein said reflector is parabolic; said lamp including a filament, said lamp positioned such that said filament is located generally at the focal point of said parabolic reflector.

20. A carrier module for interior vehicle use, said module comprising:
a rigid body;
support means on said body for supporting at least one of a light, switch, instrument or instrument control thereon;
mounting means independent of said support means for mounting said module body on a support adapted for use in a vehicle interior, said mounting means including resilient projecting means for engaging a projection on the interior vehicle support to releasably retain said body on the interior vehicle support, and slot means in said body adjacent said resilient projecting means for inserting a tool to bend and release said projecting means to remove said body from the interior vehicle support.

21. The carrier module of claim 20 wherein said rigid body includes an opening therethrough and a light assembly supported thereon for directing light through said opening and outwardly of said module.

22. A carrier module for interior vehicle use, said module comprising:
a rigid body;
support means on said body for supporting at least one of a light, switch, instrument or instrument control thereon;
mounting means for mounting said module body on a support adapted for use in a vehicle interior, said mounting means including resilient projecting means for engaging a projection on the interior vehicle support to releasably retain said body on the interior vehicle support, and slot means in said body adjacent said resilient projecting means for inserting a tool to bend and release said projecting means to remove said body from the interior vehicle support;
said module being one of a number of interchangeable modules having a predetermined exterior configuration, said module having an assembly supported on said support means, said assembly selected from the group including:
(a) a light assembly having a lamp, a lamp holder, a reflector and a lens for directing light from said lamp;
(b) a pair of light assemblies mounted adjacent one another on said module, each light assembly having a lamp, a lamp holder and a lens for separately directing light from each respective lamp;
(c) a light assembly having a lamp, a lamp holder and a reflector and a lens for directing light from said lamp, and an electrical switch for controlling the operation of said lamp; and
(d) a control unit for controlling the operation of an instrument such as a directional compass, sensing unit or the like, said control unit including a control element extending from said module.

23. A carrier module for interior vehicle use, said module comprising:
a rigid body;
support means on said body for supporting at least one of a light, switch, instrument or instrument control thereon;
mounting means for mounting said module body on a support adapted for use in a vehicle interior, said mounting means including resilient projecting means for engaging a projection on the interior vehicle support to releasably retain said body on the interior vehicle support, and slot means in said body adjacent said resilient projecting means for inserting a tool to bend and release said projecting means to remove said body from the interior vehicle support;
said rigid body including a control unit mounted on said support means for controlling the operation of an instrument such as a directional compass, sensing unit or the like, said control unit including a control element extending from said body.

24. A module comprising:
a rigid body having a light opening therethrough and a support area adjacent said light opening, said support area adapted to mount at least one of a second light, a switch, a control unit and an instrument thereon; a light support on one side of said body in alignment with said light opening; a lens support adjacent said light support; a first mounting projection independent of said support area and said light support at a first position on said body; a second mounting projection independent of said support area and said light support at a second position on said body which is spaced from said first position, said second projection being resilient and adapted to bend during mounting on a support; and an opening in said body adjacent said second projection and adapted to allow insertion of a tool for releasing said second projection from engagement with a support.

25. An interior vehicle housing assembly comprising:
a housing adapted to be supported on a vehicle, said housing including a wall portion and an interior space, said wall portion having an opening therein;
carrier means for supporting a light assembly, a control, an instrument or the like within said interior space, said carrier means including a rigid support, first mounting means for mounting one of a light assembly, a control or an instrument on said rigid support, and second mounting means on said rigid support and independent of said first mounting means for mounting said support within said wall opening; and removal means accessible from the exterior of said housing and carrier means for allowing removal of said carrier means from said wall opening without disassembling other portions of said housing assembly.

26. The assembly of claim 25 wherein said second mounting means include resilient means adjacent said removal means for retaining said carrier means in said opening; said resilient means being accessible from said removal means for release and removal of said carrier means from said opening.

27. The assembly of claim 26 wherein said second mounting means include a support flange projecting outwardly from one end of said rigid support; said resilient means including at least one resilient projection extending from the other end of said rigid support; said removal means including slot means adjacent said resilient projection for inserting a tool to bend said projection to remove said support from said housing.

28. An interior vehicle housing assembly comprising:
a housing adapted to be supported on a vehicle, said housing including a wall portion and an interior space, said wall portion having an opening therein;
carrier means for supporting a light, a control, an instrument or the like within said interior space, said carrier means including a rigid support and mounting means for mounting said support within said wall opening; and
removal means accessible from the exterior of said housing and carrier means for allowing removal of said carrier means from said wall opening without disassembling other portions of said housing assembly;
said carrier means including a light assembly on the inside surface of said rigid support, said light assembly projecting into said space and including a lamp socket, a reflector in said lamp socket for directing light through a lens, an electric lamp in said lamp socket projecting into the interior of said reflector, and a lens mounted below said lamp socket, reflector and lamp.

29. The assembly of claim 28 wherein said support further includes an electrical switch mounted thereon and wiring means in said space for connecting said switch to said lamp and to an electrical source.

30. The assembly of claim 28 wherein said support further includes a second lamp socket adjacent the first said lamp socket, said second lamp socket including an electric lamp and a second lens for directing light from said second lamp outwardly of said assembly.

31. The assembly of claim 28 wherein said rigid support includes a light opening therethrough; said lamp socket including a hollow framework extending upwardly from said rigid support and aligned over said light opening, said framework having curved, downwardly diverging sides defining a reflector recess; said reflector mounted within said reflector recess; said lamp holder means for supporting said lamp above said reflector recess, said lamp holder means including a lamp aperture opening into said reflector recess.

32. The assembly of claim 31 including resilient retaining means for releasably holding said lamp and a lamp base on said lamp holder means.

33. The assembly of claim 31 including a lens recess surrounding said light opening on the exterior side of said rigid support and lens mounting means for mounting said lens in said lens recess.

34. The assembly of claim 33 wherein said lens mounting means includes at least one lens mounting aperture adjacent said light opening and at least one lens support projection on the wall of said recess and spaced from the bottom of said recess.

35. The assembly of claim 31 wherein said rigid support further includes a second opening therethrough and adjacent said light opening.

36. The assembly of claim 35 wherein said second opening includes an electrical switch mounted therein for operating said lamp.

37. The assembly of claim 35 including a light housing aligned with said second opening on said inner surface of said rigid support, said light housing including means for receiving a lamp base thereon; a second lens recess surrounding said second opening on the exterior side of said rigid support; and light directing lens means in said second lens recess for directing light outwardly of said case assembly.

38. The case assembly of claim 35 wherein each of said light opening and second opening are recessed with respect to the exterior of said support which is flush with said wall portion.

39. The case assembly of claim 31 including a lens recess on said inside surface of said support and outlining said light opening.

40. An interior vehicle housing assembly comprising:
a housing adapted to be supported on a vehicle, said housing including a wall portion and an interior space, said wall portion having an opening therein;
carrier means for supporting a light, a control, an instrument or the like within said interior space, said carrier means including a rigid support and mounting means for mounting said support within said wall opening; and
removal means accessible from the exterior of said housing and carrier means for allowing removal of said carrier means from said wall opening without disassembling other portions of said housing assembly;
said support including a control unit mounted thereon for controlling the operation of an instrument such as a directional compass, sensing unit or the like adapted to be mounted within said housing, said control unit controlling a control element extending from said support for access from the exterior of said housing assembly.

41. An interior vehicle housing assembly comprising:
a housing adapted to be supported on a vehicle, said housing including a wall portion and an interior space, said wall portion having an opening therein;
carrier means for supporting a light, a control, an instrument or the like within said interior space, said carrier means including a rigid support and mounting means for mounting said support within said wall opening; and
removal means accessible from the exterior of said housing and carrier means for allowing removal of said carrier means from said wall opening without disassembling other portions of said housing assembly;
said carrier means being one of a number of interchangeable modules configured to the contour of said opening and having support means for supporting one of a group of assemblies and units thereon, said assemblies and units selected from the group including:

(a) a light assembly having a lamp, a lamp holder and a reflector and a lens for directing light from said lamp outwardly of said housing assembly;

(b) a pair of light assemblies mounted adjacent one another on said module, each light assembly having a lamp, a lamp holder and a lens for separately directing light from each respective lamp outwardly of said housing assembly;

(c) a light assembly having a lamp, a lamp holder, a reflector and a lens for directing light from said lamp outwardly of said housing assembly, and an electrical switch for controlling the operation of said lamp; and (d) a control unit for controlling the operation of an instrument such as a directional compass, sensing unit or the like, said control unit including a control element extending from said module and said housing assembly for access from the exterior of said assembly.

* * * * *

UNITED STATES PATENT AND TRADEMARK OFFICE
CERTIFICATE OF CORRECTION

PATENT NO.  : 4,807,096
DATED       : February 21, 1989
INVENTOR(S) : Brian I. Skogler et al.

It is certified that error appears in the above-identified patent and that said Letters Patent is hereby corrected as shown below:

Column 5, line 30:

"motor" should be --mirror--.

Column 8, line 35:

"adaptd" should be --adapted--.

Column 9, line 5:

"projectig" should be --projecting--.

Column 13, line 53:

"apeture" should be --aperture--.

Column 20, claim 40, line 48:

"controlling" should be --including--.

Signed and Sealed this

Twelfth Day of December, 1989

*Attest:*

JEFFREY M. SAMUELS

*Attesting Officer*   *Acting Commissioner of Patents and Trademarks*